United States Patent
Kurazumi et al.

(10) Patent No.: US 8,299,184 B2
(45) Date of Patent: Oct. 30, 2012

(54) RUBBER COMPOSITION FOR TIRE SIDEWALL AND TIRE

(75) Inventors: Junko Kurazumi, Tokyo (JP); Kouji Masaki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/279,252

(22) PCT Filed: Feb. 14, 2007

(86) PCT No.: PCT/JP2007/052633
§ 371 (c)(1),
(2), (4) Date: Aug. 13, 2008

(87) PCT Pub. No.: WO2007/094370
PCT Pub. Date: Aug. 23, 2007

(65) Prior Publication Data
US 2009/0203828 A1    Aug. 13, 2009

(30) Foreign Application Priority Data
Feb. 15, 2006   (JP) .................. 2006-037730

(51) Int. Cl.
C08F 236/06    (2006.01)
C08F 236/10    (2006.01)
C08L 53/02     (2006.01)
C08K 13/02     (2006.01)

(52) U.S. Cl. ............. 525/331.9; 526/335; 526/340.4; 524/571; 524/495; 152/450; 152/905; 525/333.2

(58) Field of Classification Search .......... 524/495, 524/571; 525/331.9, 333.2; 152/450, 905; 526/335, 340.4
See application file for complete search history.

(56) References Cited

U.S. PATENT DOCUMENTS

| 5,464,899 A | * | 11/1995 | Freeman et al. ............ 524/504 |
| 2004/0254301 A1 | * | 12/2004 | Tsukimawashi et al. ..... 525/271 |
| 2005/0250883 A1 | | 11/2005 | Shibata et al. |
| 2007/0055029 A1 | * | 3/2007 | Suzuki et al. ............. 526/164 |

FOREIGN PATENT DOCUMENTS

| EP | 0 604 833 A2 | 7/1994 |
| EP | 1 637 548 A1 | 3/2006 |
| JP | 2-208103 A | 8/1990 |
| JP | 5-279514 A | 10/1993 |
| JP | 7-76635 A | 3/1995 |
| JP | 8-20202 A | 1/1996 |
| JP | 2003-327749 A | 11/2003 |
| JP | 2004-91715 A | 3/2004 |
| JP | 2005-15590 A | 1/2005 |

* cited by examiner

*Primary Examiner* — James J. Seidleck
*Assistant Examiner* — Deve E Valdez
(74) *Attorney, Agent, or Firm* — Sughrue Mion, PLLC

(57) ABSTRACT

A rubber composition for tire sidewall which comprises a rubber component, which comprises polybutadiene rubber having a content of the cis-1,4-bond of 92% or greater and a content of the vinyl bond of 1.5% or smaller and natural rubber and/or at least one other diene-based synthetic rubber, and 10 to 70 parts by mass of carbon black having a specific surface area by nitrogen adsorption of 20 to 100 $m^2/g$ per 100 parts by mass of the rubber component and does not comprise a softener having an aniline point of 50° C. or lower and a tire using the rubber composition for sidewall. Excellent resistance to cut growth is obtained while sufficient workability is surely exhibited.

8 Claims, No Drawings

RUBBER COMPOSITION FOR TIRE SIDEWALL AND TIRE

TECHNICAL FIELD

The present invention relates to a rubber composition for tire sidewall and a tire using the rubber composition for sidewall. More particularly, the present invention relates to a rubber composition for tire sidewall which does not comprise a softener having an aniline point of 50° C. or lower.

BACKGROUND ART

Recently, further improvement in durability of tires is being required based on the social requirement for the material saving, and a rubber composition exhibiting a greater resistance to cut growth is desired. However, a softener is necessary for a rubber composition for tire sidewall so that the sufficient workability is maintained, and improving the resistance to cut growth without adversely affecting workability has been difficult when a softener is present.

Improvements in the rubber component have been attempted to overcome the above problem. For example, in Patent Reference 1, it is proposed that the resistance to cut growth is improved by disposing a specific ethylene-propylene-diene terpolymer at tire sidewall.

In Patent Reference 2, it is proposed that contents of the cis-1,4-bond and the vinyl bond in polybutadiene rubber obtained by polymerization in the presence of a catalyst having a specific rare earth element are limited to specific ranges to improve the resistance to cut growth.

However, it remains difficult that the excellent resistance to cut growth is obtained while the sufficient workability is exhibited, and it is desired that the excellent resistance to cut growth is obtained while the sufficient workability is surely exhibited

[Patent Reference 1] Japanese Patent Application Laid-Open No. Heisei 8 (1996)-20202

[Patent Reference 2] Japanese Patent Application Laid-Open No. 2005-15590

DISCLOSURE OF THE INVENTION

Under the above circumstances, the present invention has an object of providing a rubber composition for tire sidewall which is provided with excellent resistance to cut growth while sufficient workability is surly exhibited and a tire using the rubber composition for sidewall.

As the result of intensive studies by the present inventors to achieve the above object, it was found that the object of the present invention could be achieved with a rubber composition comprising a specific polybutadiene at least as a portion of the rubber component. The present invention has been completed based on the knowledge.

The present invention provides a rubber composition for tire sidewall which comprises a rubber component and 10 to 70 parts by mass of carbon black having a specific surface area by nitrogen adsorption of 20 to 100 m$^2$/g per 100 parts by mass of the rubber component and does not comprise a softener having an aniline point of 50° C. or lower and the rubber component comprises polybutadiene rubber having a content of a cis-1,4-bond of 92% or greater and a content of a vinyl bond of 1.5% or smaller, and natural rubber and/or at least one other diene-based synthetic rubber, and a tire using the rubber composition for sidewall.

In accordance with the present invention, the rubber composition for tire sidewall which is provided with excellent resistance to cut growth while sufficient workability is surely exhibited and the tire using the rubber composition for sidewall is provided.

THE MOST PREFERRED EMBODIMENT TO CARRY OUT THE INVENTION

It is required that the polybutadiene rubber used in the rubber composition for tire sidewall of the present invention have a content of the cis-1,4-bond of 92% or greater and a content of the vinyl bond of 1.5% or smaller. When the content of the cis-1,4-bond is smaller than 92% or when the content of the vinyl bond exceeds 1.5%, the resistance to cut growth decreases. It is preferable that the content of the cis-1,4-bond is 94.0% or greater, more preferably 97% or greater and most preferably 98% or greater.

It is preferable for further improving the resistance to cut growth that the polybutadiene rubber simultaneously satisfies the following relations (1) to (3):

content of cis-1,4-bond≧98.00(%)     (1)

content of vinyl bond≦0.75×(content of cis-1,4-bond)−73.25(%)     (2)

content of vinyl bond≦0.35(%)     (3)

As the polybutadiene rubber used for the rubber composition for tire sidewall of the present invention, a high cis-1,4-polybutadiene obtained by polymerization of 1,3-butadiene using a catalyst which comprises as the main component a catalyst comprising a compound having a rare earth element of a lanthanoid series is preferable from the standpoint of suppressing the content of the vinyl bond to 1.5% or smaller.

The catalyst system which comprises as the main component a catalyst comprising a compound having a rare earth element of a lanthanoid series and is preferably used for the polymerization for providing the polybutadiene rubber used in the rubber composition of the present invention will be described in the following.

It is preferable that 1,3-butadiene is polymerized using a catalyst system comprising:

Component (A): a compound having a rare earth element having an atomic number of 57 to 71 in the Periodic Table or a reaction product of said compound with a Lewis base;

Component (B): an organoaluminum compound represented by the following formula (I):

AlR$^1$R$^2$R$^3$     (I)

wherein R$^1$ and R$^2$ each represent hydrogen atom or a hydrocarbon group having 1 to 10 carbon atoms, which may be the same with or different from each other, and R$^3$ represents a hydrocarbon group having 1 to 10 carbon atoms, which may be the same with or different from the groups represented by R$^1$ and R$^2$; and Component (C): at least one of Lewis acids, complex compounds of metal halide compounds and Lewis bases and organic compounds having an active halogen.

In the present invention, Component (A) of the catalyst system used for the polymerization providing the polybutadiene rubber is a compound having a rare earth element having an atomic number of 57 to 71 in the Periodic Table or a reaction product of said compound with a Lewis base. Among the rare earth elements having an atomic number of 57 to 71, neodymium, praseodymium, cerium, lanthanum, gadolinium and mixtures of these elements are preferable, and neodymium is more preferable.

As the compound having a rare earth element, salts soluble in hydrocarbon solvents are preferable. Examples of the salt include carboxylic acid salts, alkoxides, β-diketone complex compounds, phosphoric acid salts and phosphorous acid salts of the above rare earth elements. Among these salts, carboxylic acid salts and phosphoric acid salts are preferable, and carboxylic acid salts are more preferable.

Examples of the carboxylic acid salt of the rare earth element include compounds represented by the following general formula (II):

$(R^4-CO_2)_3M$      (II)

wherein, $R^4$ represents a hydrocarbon group having 1 to 20 carbon atoms, and M represents a rare earth element having an atomic number of 57 to 71 in the Periodic Table. $R^4$ may represent a saturated group or an unsaturated group. It is preferable that $R^4$ represents an alkyl group or an alkenyl group, which may be a linear, branched or cyclic group. The carboxyl group is bonded to a primary, secondary or tertiary carbon atom. Examples of the carboxylic acid salt include salts of octanoic acid, 2-ethylhexanoic acid, oleic acid, neodecanoic acid, stearic acid, benzoic acid, naphthenic acid and Versatic acid [a trade name; manufactured by SHELL KAGAKU Co. Ltd.; a carboxylic acid in which carboxyl group is bonded to a tertiary carbon atom]. Among these salts, salts of 2-ethyl-hexanoic acid, neodecanoic acid, naphthenic acid and Versatic acid are preferable.

Examples of the alkoxide of the rare earth element include compounds represented by the following general formula (III):

$(R^5O)_3M$      (III)

wherein $R^5$ represents a hydrocarbon group having 1 to 20 carbon atoms, and M represents a rare earth element having an atomic number of 57 to 71 in the Periodic Table. Examples of the alkoxy group represented by $R^5O$ include 2-ethylhexyloxy group, oleyloxy group, strearyloxy group, phenoxy group and benzyloxy group. Among these groups, 2-ethylhexyl-oxy group and benzyloxy group are preferable.

Examples of the β-diketone complex compound of the rare earth element include acetylacetone complex compounds, benzoylacetone complex compounds, propionitrileacetone complex compounds, valeryl-acetone complex compounds and ethylacetylacetone complex compounds of the rare earth elements described above. Among these compounds, acetylacetone complex compounds and ethylacetylacetone complex compounds are preferable.

Examples of the phosphoric acid salt and the phosphorous acid salt of the rare earth element described above include salts of the rare earth elements described above with bis(2-ethylhexyl) phosphate, bis(1-methyl-heptyl) phosphate, bis(p-nonylphenyl) phosphate, bis(polyethylene glycol p-nonylphenyl) phosphate, (1-methylheptyl)(2-ethylhexyl) phosphate, (2-ethylhexyl)(p-nonylphenyl) phosphate, mono-2-ethylhexyl 2-ethylhexyl-phosphonate, mono-p-nonylphenyl 2-ethylhexylphosphonate, bis(2-ethyl-hexyl)phosphinic acid, bis(1-methylheptyl)phosphinic acid, bis(p-nonyl-phenyl)phosphinic acid, (1-methylheptyl)(2-ethylhexyl)phosphinic acid and (2-ethylhexyl)(p-nonylphenyl)phosphinic acid. Among the above salts, salts of the rare earth elements described above with bis(2-ethylhexyl) phosphate, bis(1-methylheptyl) phosphate, mono-2-ethylhexyl 2-ethylhexylphosphonate and bis(2-ethylhexyl)phosphinic acid are preferable.

Among the above compounds having a rare earth element, phosphoric acid salts of neodymium and carboxylic acid salts of neodymium are preferable, and branched carboxylic acid salts of neodymium such as 2-ethylhexanoic acid salt of neodymium, neodecanoic acid salt of neodymium and Versatic acid salt of neodymium are more preferable.

Component (A) may be a reaction product of the compound having a rare earth element described above and a Lewis base. The reaction product exhibits advantages in that the solubility of the compound having a rare earth element in solvents is improved by the Lewis base, and the reaction product can be stored for a long time with stability. The Lewis base for easily solubilizing the compound having a rare earth metal into solvents and providing the stability of the compound having a rare earth metal during storage for a long time is used as a mixture with the compound having a rare earth element containing 0 to 30 moles and preferably 1 to 10 moles of the Lewis base per 1 mole of the rare earth element or as a product of the reaction of the two components conducted in advance. Examples of the Lewis base include acetylacetone, tetrahydrofuran, pyridine, N,N-dimethylformamide, thiophene, diphenyl ether, triethylamine, organophosphorus compounds and monohydric and dihydric alcohols.

The compound having a rare earth element or the reaction product of the compound having a rare earth element with the Lewis base of Component (A) may be used singly or as a mixture of two or more.

In the present invention, examples of the organoaluminum compound represented by general formula (I) of Component (B) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutyl-aluminum hydride, dihexylaluminum hydride, diisohexylaluminum hydride, dioctylaluminum hydride, diisooctylaluminum hydride, ethylaluminum dihydride, n-propylaluminum dihydride and isobutylaluminum dihydride. Among these compounds, triethyl-aluminum, triisobutylaluminum, diethylaluminum hydride and diisobutylaluminum hydride are preferable. The organoaluminum compound of Component (B) described above may be used singly or as a mixture of two or more.

In the present invention, Component (C) of the catalyst system used for the polymerization for providing the polybutadiene rubber is at least one halogen compound selected from the group consisting of Lewis acids, complex compounds of metal halides and Lewis bases and organic compounds having an active halogen.

The Lewis acid exhibits the Lewis acidity and is soluble in hydrocarbons. Examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethyl-aluminum sesquichloride, dibutyltin dichloride, aluminum tribromide, antimony trichloride, antimony pentachloride, phosphorus trichloride, phosphorus pentachloride, tin tetrachloride and silicon tetrachloride. Among these compounds, diethylaluminum chloride, ethylaluminum sesquichloride, ethylaluminum dichloride, diethylaluminum bromide, ethylaluminum sesquibromide and ethylaluminum dibromide are preferable.

Reaction products of an alkylaluminum and a halogen such as the reaction product of triethylaluminum and bromine can also be used.

Examples of the metal halide constituting the complex compound of the metal halide and the Lewis base described above include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide and gold bromide. Among these metal halides, magnesium chloride, calcium chloride, barium chloride, manganese chloride, zinc chloride and copper chloride are preferable, and magnesium chloride, manganese chloride, zinc chloride and copper chloride are more preferable.

As the Lewis base constituting the complex compound of the metal halide and the Lewis base described above, phosphorus compounds, carbonyl compounds, nitrogen compounds, ether compounds and alcohols are preferable. Examples of the Lewis base include tributyl phosphate, tri-2-ethylhexyl phosphate, triphenyl phosphate, tricresyl phosphate, triethylphosphine, tributylphosphine, triphenylphosphine, diethyl-phosphinoethane, diphenylphosphinoethane, acetylacetone, benzoyl-acetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol and lauryl alcohol. Among these compounds, tri-2-ethylhexyl phosphate, tricresyl phosphate, acetylacetone, 2-ethylhexanoic acid, Versatic acid, 2-ethylhexyl alcohol, 1-decanol and lauryl alcohol are preferable.

The Lewis base described above is brought into the reaction, in general, in an amount of 0.01 to 30 moles and preferably in an amount of 0.5 to 10 moles per 1 mole of the metal halide described above. When the reaction product of the metal halide with the Lewis base described above is used, the amount of the metal left remaining in the polymer can be decreased.

Examples of the organic compound having an active halogen include benzyl chloride.

In the present invention, it is preferable that the catalyst system used for the polymerization to provide the polybutadiene rubber further comprises an organoaluminumoxy compound, which is a so-called aluminoxane, as Component (D) in combination with Components (A) to (C) described above. Examples of the aluminoxane of Component (D) include methylaluminoxane, ethylaluminoxane, propylaluminoxane, butylaluminoxane and chloroaluminoxane. By adding the aluminoxane of Component (D), the molecular weight distribution is made sharper, and the activity of the catalyst is increased.

It is more preferable that the catalyst system is prepared preliminarily in the presence of Component (A), Component (B), Component (C), Component (D) and the conjugated diene monomer.

The composition, i.e., the relative amounts of the components, of the catalyst system used in the present invention can be suitably selected in accordance with the object or the necessity. It is preferable that Component (A) is used in an amount of 0.00001 to 1.0 mmole and more preferably 0.0001 to 0.5 mmole per 100 g of 1,3-butadiene. By adjusting the amount of Component (A) in the above range, the excellent activity of the polymerization is obtained, and the step of removing ashes can be eliminated.

The ratio of the amount of by mole of Component (A) to the amount by mole of Component (B) [Component (A): Component (B)] is, in general, in the range of 1:1 to 1:700 and preferably in the range of 1:3 to 1:500.

The ratio of the amount by mole of the halogen in Component (A) to the amount by mole of the halogen in Component (C) is, in general, in the range of 1:0.1 to 1:30, preferably in the range of 1:0.2 to 1:15 and most preferably in the range of 1:2.0 to 1:5.0.

The ratio of the amount by mole of aluminum in Component (D) to the amount by mole of Component (A) is, in general, in the range of 1:1 to 700:1 and preferably in the range of 3:1 to 500:1. The composition, i.e., the relative amounts of the components, of the catalyst system in the above ranges is preferable since the catalyst exhibits great activity, and the step of removing catalyst residues can be eliminated.

The polymerization may be conducted in the presence of hydrogen gas in combination with Components (A) to (C) so that the molecular weight of the polymer is adjusted.

In addition to Components (A), (B) and (C) and Component (D) which is used where necessary, 1,3-butadiene may be used as a component of the catalyst in a small amount, i.e., in an amount of 0 to 1,000 moles per 1 mole of the compound of Component (A), where necessary. Although 1,3-butadiene is not essential as the component of the catalyst, the use of 1,3-butadiene in combination exhibits the advantage of further increasing the catalyst activity.

For the preparation of the catalyst described above, for example, Components (A) to (C) are dissolved in a solvent and, where necessary, 1,3-butadiene is brought into the reaction.

In the preparation of the catalyst, the order of addition of the components is not particularly limited. The aluminoxane may be further added as Component (D). From the standpoint of increasing the catalyst activity and decreasing the induction period before the initiation of the polymerization, it is preferable that the above components are mixed, brought into reaction with each other and aged in advance.

The temperature of the aging is about 0 to 100° C. and preferably 20 to 80° C. When the temperature of the aging is lower than 0° C., the aging is not achieved sufficiently. When the temperature of the aging exceeds 100° C., there is the possibility that the catalyst activity decreases and the molecular weight distribution becomes wide.

The time of the aging is not particularly limited. The aging can be sufficiently achieved by bringing the components into contact with each other in the line before being added into the polymerization reactor. In general, a time of the aging of 0.5 minutes or longer is sufficient, and the prepared catalyst is stable for several days.

In the preparation of the polybutadiene rubber used for the rubber composition for tire sidewall of the present invention, it is preferable that the solution polymerization of 1,3-butadiene is conducted in an organic solvent using the catalyst comprising the compound having the rare earth element of the lanthanoid series described above. It is preferable that an inert organic solvent is used as the solvent for the polymerization. Examples of the inert organic solvent include saturated aliphatic hydrocarbons having 4 to 10 carbon atoms such as butane, pentane, hexane and heptane, saturated alicyclic hydrocarbons having 5 to 20 carbon atoms such as cyclopentane and cyclohexane, monoolefins such as 1-butene and 2-butene, aromatic hydrocarbons such as benzene, toluene and xylene, and halogenated hydrocarbons such as methylene chloride, chloroform, carbon tetrachloride, trichloroethylene, perchloro-ethylene, 1,2-dichloroethane, chlorobenzene, bromobenzene and chlorotoluene.

Among the above solvents, aliphatic hydrocarbons and alicyclic hydrocarbons, which have 5 or 6 carbon atoms, are preferable. The solvent may be used singly or as a mixture of two or more. It is preferable that the concentration of 1,3-butadiene of the monomer used in the polymerization in the solvent is 5 to 50% by mass and more preferably 10 to 30% by mass.

It is preferable that the temperature of the polymerization for providing the polybutadiene rubber is selected in the range of −80 to 150° C. and more preferably in the range of −20 to 120° C. The polymerization can be conducted under the pressure formed by the reaction. In general, it is preferable that the operation is conducted under a pressure which is sufficient for keeping the monomer substantially in the liquid state. The pressure is different depending on the substances used for the polymerization, the solvent used for the polymerization and the temperature. A higher pressure may be used, where desired, and the higher pressure can be obtained in accordance with a suitable method such as addition of the pressure to the reactor with a gas inert to the polymerization.

In the polymerization, it is preferable that the entire raw materials taking part in the polymerization such as the polymerization catalyst, the solvent and the monomer are used after substances adversely affecting the reaction such as water, oxygen, carbon dioxide and protonic compounds have been removed.

The preparation of the polybutadiene rubber may be conducted in accordance with any of the batch reaction and the continuous reaction.

It is preferable that the Mooney viscosity ($ML_{1+4}$, 100° C.) of the polybutadiene rubber advantageously used for the rubber composition for tire sidewall of the present invention is 10 to 100, more preferably 15 to 80 and most preferably 20 to 70. When the Mooney viscosity is smaller than 10, the sufficient physical properties such as the excellent resistance to cut growth are not obtained. When the Mooney viscosity exceeds 100, workability in mixing and in extrusion becomes poor.

In the present invention, it is preferable that the polybutadiene rubber has a number-average molecular weight in the range of 100,000 to 500,000 and more preferably in the range of 150,000 to 300,000. When the number-average molecular weight is in the above range, excellent resistance to cut growth can be achieved while the decrease in the modulus and the increase in the hysteresis loss of the vulcanizate are suppressed, and the excellent workability can be obtained in the mixing of the rubber composition for tire sidewall of the present invention. It is preferable that the ratio of the weight-average molecular weight (Mw) to the number-average molecular weight (Mn) [(Mw/Mn)], i.e., the molecular weight distribution (Mw/Mn), is in the range of 1.6 to 3.5 and more preferably in the range of 1.6 to 2.7.

The weight-average molecular weight (Mw) and the number-average molecular weight (Mn) are the values obtained by the measurement of the gel permeation chromatography and expressed by the values of the corresponding polystyrene. When the molecular weight distribution (Mw/Mn) of the polybutadiene rubber is in the above range, mixing can be conducted easily without adverse effects on the workability of the rubber composition by the use of the polybutadiene rubber in the rubber composition, and the physical properties of the rubber composition can be sufficiently improved.

It is necessary that the rubber composition for tire sidewall of the present invention do not comprise a softener having an aniline point of 50° C. or lower. When the rubber composition comprises a softener having an aniline point of 50° C. or lower, crystallization of the polybutadiene rubber is adversely affected to a great degree.

Although the rubber composition for tire sidewall of the present invention may comprise no softeners, it is preferable that the rubber composition comprises a softener having an aniline point higher than 50° C. and/or a softener having no aniline point.

The aniline point is the lowest temperature at which aniline and a softener are perfectly compatible with each other. Examples of the softener include process oils, extenders, petroleum resins, asphalt and tackifiers. In general, solid substances such as petroleum resins and tackifiers do not have aniline points. As the petroleum resin, any of C5-based petroleum resins which are aliphatic hydrocarbon resins and C9-based petroleum resins which are aromatic hydrocarbon resins can be used. C5-based petroleum resins alone, mixed resins of C5-based petroleum resins with C9-based petroleum resins and copolymer resins of C5-based petroleum resins with C9-based petroleum resins are preferable.

In the above, C5 means that the number of carbon atom is 5, and C9 means that the number of carbon atom is 9.

As for the process oil, it is preferable that the kinematic viscosity (40° C.) is 15 to 35 $mm^2/s$ and the aniline point is 60 to 120° C. When the kinematic viscosity (40° C.) is 15 $mm^2/s$ or greater, the sufficient workability of the rubber composition of the present invention is surely exhibited. When the kinematic viscosity is 35 $mm^2/s$ or smaller, the formation of crystals in the polybutadiene is not suppressed so much as to adversely affect the physical properties of the vulcanizate of the rubber composition of the present invention. When the aniline point is 60° C. or higher, the formation of crystals in the polybutadiene is not adversely affected. When the aniline point is 120° C. or lower, the sufficient workability of the rubber composition of the present invention is surely exhibited. Examples of the process oil include Naphthenic oil manufactured by JAPAN ENERGY Co., Ltd. (the kinematic viscosity (40° C.): 22 $mm^2/s$; the aniline point: 83° C.).

It is preferable that the softener is used in an amount of 1 part by mass or more per 100 parts by mass of the rubber component from the standpoint of improving the workability. It is preferable that the softener is used in an amount of 15 parts by mass or less and more preferably 10 parts by mass or less per 100 parts by mass of the rubber component from the standpoint of surely obtaining the excellent resistance to cut growth.

Examples of the C5-based petroleum resin include "HILETS" (a trade name) manufactured by MITSUI KAGAKU CO., Ltd.; and "QUINTONE A100", "QUINTONE B170", "QUINTONE K100", "QUINTONE M100" and "QUINTONE R100" (trade names) manufactured by NIPPON ZEON Co., Ltd. Examples of the C9-based petroleum resin include "NEOPOLYMER 120" and "NEOPOLYMER 140" (trade names) manufactured by SHIN-NIPPON SEKIYU Co., Ltd. Examples of the mixed resin of C5-based petroleum resins with C9-based petroleum resins include "QUINTONE U190", "QUINTONE N295" and "QUINTONE S100" (trade names) manufactured by NIPPON ZEON Co., Ltd. Examples of the copolymer resin of C5-based petroleum resins with C9-based petroleum resins include "TOHO HIRESIN" (a trade name) manufactured by TOHO KAGAKU Co., Ltd.

It is necessary that the rubber composition of the present invention comprise carbon black as the reinforcing filler. The rubber composition may comprise a combination of carbon black and an inorganic filler. Carbon black is not particularly limited and may be selected as desired from carbon blacks conventionally used as the reinforcing filler of rubber. Examples of the carbon black include GPF, FEF, SRF, HAF and IISAF. The specific surface area by nitrogen absorption of the carbon black is 20 to 100 m$^2$/g, preferably 20 to 90 m$^2$/g and most preferably 30 to 90 m$^2$/g. The effect of improving physical properties can be exhibited by using the carbon black. HAF and FEF exhibiting excellent resistance to fracture are preferable.

Examples of silicas include wet silica (hydrous silica) and dry silica (anhydrous silica). Among these substances, wet silica which simultaneously exhibits the effect of improving the resistance to fracture and the excellent wet grip property most remarkably is preferable.

As the inorganic filler other than the silica described above, alumina ($Al_2O_3$) such as γ-alumina and α-alumina, alumina hydrates ($Al_2O_3.H_2O$) such as behmite and diaspore, aluminum hydroxide [$Al(OH)_3$] such as gibsite and bialite, aluminum carbonate [$Al_2(CO_3)_2$], magnesium hydroxide [$Mg(OH)_2$], magnesium oxide (MgO), magnesium carbonate ($MgCO_3$), talc ($3MgO \cdot 4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminum magnesium oxide ($MgO.Al_2O_3$), clay ($Al_2O_3.2SiO_2$), kaolin ($Al_2O_3.2SiO_2.2H_2O$), pyrofilite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$ etc.), magnesium silicate ($Mg_2SiO_4$, $MgSiO_3$ etc.), calcium silicate ($Ca_2.SiO_4$ etc.), aluminum calcium silicate ($Al_2O_3.CaO.2SiO_2$ etc.), magnesium calcium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$] and crystalline aluminosilicates having hydrogen, an alkali metal or an alkaline earth metal for modifying the electric charge such as various types of zeolite, can be used. The inorganic filler other than silica may be used by replacing a portion of carbon black singly or in combination of two or more.

In the rubber composition of the present invention, when the silica is used as the reinforcing filler, silane coupling agents may be used so that the reinforcing property of silica is further enhanced. Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetra-sulfide, bis(2-trimethoxysilylethyl) tetrasulfide and 3-mercaptopropyl-trimethoxysilane. The silane coupling agent may be used singly or in combination of two or more. It is preferable that the amount of the coupling agent is selected in the range of 1 to 20% by mass based on the amount of silica although the preferable amount of the silane coupling agent is different depending on the type of the coupling agent.

As described above, the rubber composition of the present invention comprises the rubber component which comprises polybutadiene rubber having a content of a cis-1,4-bond of 92% or greater and a content of a vinyl bond of 1.5% or smaller and natural rubber and/or at least one other diene-based synthetic rubber. The other diene-based synthetic rubber may be any rubber selected from the entire diene-based synthetic rubbers other than the polybutadiene rubber described above. Example of the other diene-based synthetic rubber include polybutadiene rubber other than the polybutadiene rubber described above, synthetic polyisoprene rubber, styrene-butadiene copolymer rubber, ethylene-propylene-diene terpolymer rubber, butyl rubber, halogenated butyl rubber and acrylonitrile-butadiene copolymer rubber.

It is preferable that the rubber component comprises 20 to 80 parts by mass of the polybutadiene rubber, and 80 to 20 parts by mass of natural rubber and/or at least one other diene-based synthetic rubber, per 100 parts by mass of the rubber component since more excellent resistance to cut growth can be exhibited when the amounts are in the above ranges.

The rubber composition of the present invention may further comprise various chemicals conventionally used in the rubber industry such as vulcanizing agents, vulcanization accelerators, antioxidants, antiscorching agents, zinc oxide and stearic acid as long as the object of the present invention is not adversely affected, where desired.

The rubber composition of the present invention can be, in general, crosslinked with sulfur, and sulfur is preferable as the crosslinking agent. It is preferable that the amount of the crosslinking agent is 0.1 to 10.0 parts by mass and more preferably 1.0 to 5.0 parts by mass as the amount of sulfur per 100 parts by mass of the rubber component. When the amount of the crosslinking agent is 0.1 part by mass or more, the low heat buildup property and the resistance to fracture of the vulcanized rubber are excellent. When the amount of the crosslinking agent is 10.0 parts by mass or less, the rubber elasticity is excellent.

The vulcanization accelerator used in the present invention is not particularly limited. Examples of the vulcanization accelerator include thiazole-based vulcanization accelerators such as M (2-mercaptobenzo-thiazole), DM (dibenzothiazyl disulfide) and CZ (N-cyclohexyl-2-benzothiazylsulfenamide) and guanidine-based vulcanization accelerators such as DPG (diphenylguanidine). It is preferable that the amount of the vulcanization accelerator is 0.1 to 5.0 parts by mass and more preferably 0.2 to 3.0 parts by mass per 100 parts by mass of the rubber component.

Examples of the antioxidant which can be used in the rubber composition of the present invention include 3C(N-isopropyl-N'-phenyl-p-phenylenediamine), 6C [N-(1,3-dimethylbutyl)-N'-phenyl-p-phenylene-diamine], AW (6-ethoxy-2,2,4-trimethyl-1,2-dihydroquinoline) and condensates of diphenylamine and acetone at high temperatures. It is preferable that the amount of the antioxidant is 0.1 to 5.0 parts by mass and more preferably 0.3 to 3.0 parts by mass per 100 parts by mass of the rubber component.

The rubber composition of the present invention can be obtained by mixing the components in amounts in accordance with the formulation described above using a mixer such as rolls and an internal mixer. After being processed, the rubber composition is vulcanized and advantageously used as the rubber composition for tire sidewall. In the mixing, after the rubber components, the fillers and the softeners are mixed together in the non-product mixing, the rubber composition obtained in the non-product mixing or in further mixing after the non-product mixing is mixed with various chemicals for vulcanization in the product mixing.

The tire of the present invention is produced in accordance with the conventional process using the rubber composition of the present invention for sidewall. Specifically, the rubber composition of the present invention comprising the various chemicals as described above is processed for preparing various members of the tire in the unvulcanized condition, and the members are assembled on a tire former in accordance with the conventional process to prepare a green tire. The prepared green tire is treated under a pressure at a high temperature in a curing machine, and a tire is obtained.

The tire of the present invention obtained as described above is provided with the excellent resistance to cut growth. Since the workability of the rubber composition is excellent, the productivity is excellent.

EXAMPLES

The present invention will be described more specifically with reference to examples in the following. However, the present invention is not limited to the examples.

Physical properties of polybutadiene rubbers, carbon black, vulcanized rubbers and unvulcanized rubbers were measured in accordance with the following methods.

<<Physical Properties of Polybutadiene Rubber>>
<Analysis of the Microstructure in Accordance with the Fourier Transform Infrared Analysis (FT-IR)>

Using carbon sulfide alone placed in the same cell as that used for the measurement of a sample as the reference, a FT-IR transmission spectrum of a carbon disulfide solution of a polybutadiene rubber having a concentration adjusted at 5 mg/liter was obtained. The values of e, f and g were obtained in accordance with the following determinantal equation (IV):

$$\begin{bmatrix} 1.7455 & 0 & -0.0151 \\ -0.0454 & 0.4292 & -0.0129 \\ -0.007 & 0 & 0.3746 \end{bmatrix} \begin{bmatrix} \log_{10}(a/d) \\ \log_{10}(a/b) \\ \log_{10}(a/c) \end{bmatrix} = \begin{bmatrix} e \\ f \\ g \end{bmatrix} \quad (IV)$$

wherein a represents the value of the upward peak at about 1130 cm$^{-1}$, b represents the value of the downward peak at about 967 cm$^{-1}$, c represents the value of the downward peak at about 911 cm$^{-1}$, and d represents the value of the downward peak at about 736 cm$^{-1}$, and the content of the cis-1,4 bond, the content of the trans-1,4 bond and the content of the vinyl bond were obtained from the obtained values in accordance with the following equations (V), (VI) and (VII):

(content of the cis-1,4-bond)=$e/(e+f+g) \times 100\%$ (V)

(content of the trans-1,4 bond)=$f/(e+f+g) \times 100\%$ (VI)

(content of the vinyl bond)=$g/(e+f+g) \times 100\%$ (VII)

The upward peak at about 1130 cm$^{-1}$ is used for the base line; the downward peak at about 967 cm$^{-1}$ is assigned to the trans-1,4-bond; the downward peak at about 911 cm$^{-1}$ is assigned to the vinyl bond; and the downward peak at about 736 cm$^{-1}$ is assigned to the cis-1,4 bond.

<Measurement of Number-Average Molecular Weight (Mn), Weight-Average Molecular Weight (Mw) and Molecular Weight Distribution (Mw/Mn)>

The above values were measured using GPC [manufactured by TOSO Co. Ltd., HLC-8020] with a refractometer as the detector. The results of the measurement were expressed by the values of the corresponding monodisperse polystyrene which was used as the reference. The column was GMHXL [manufactured by TOSO Co. Ltd.], and the solvent for the elution was tetrahydrofuran.

<Mooney Viscosity of Material Rubber>

The Mooney viscosity ML1+4 was measured at 100° C. in accordance with the method of Japanese Industrial Standard K 6300-1:2001.

<<Physical Properties of Softener>>
<Aniline Point>

The amine point of a softener was measured in accordance with the method of Japanese Industrial Standard K 2256.

<Kinematic Viscosity>

The kinematic viscosity was measured at 40° C. in accordance with the method of Japanese Industrial Standard K 2283.

<<Physical Properties of Carbon Black>>
<Specific Surface Area by Nitrogen Adsorption>

The specific surface area by nitrogen adsorption was measured in accordance with the method of Japanese Industrial Standard K 6217-2:2001.

<<Physical Properties of Unvulcanized Rubber Composition>>
<Mooney Viscosity>

The Mooney viscosity ML1+4 was measured at 128° C. in accordance with the method of Japanese Industrial Standard K 6300-1:2001.

<<Physical Properties of Vulcanized Rubber>>
<Resistance to Cut Growth>

A test piece was prepared by forming a cut having a length of 1 mm at the center of a rubber sample having a dumbbell shape. The fatigue test was conducted using an apparatus for repeated fatigue test under the condition of a fixed strain of 100% with no initial strain and a frequency of 300 rpm, and the time before fracture took place due to growth of the cut was used for the evaluation. The result was expressed as an index using the result of Comparative Example 1 as the reference, which was set at 100. The greater the value of the index, the better the resistance to cut growth.

<Low Heat Buildup Property>

For the measurement of the low heat buildup property, tan δ (50° C.) was measured at a temperature of 50° C., a strain of 3% and a frequency of 15 Hz using an apparatus for measuring viscoelasticity (manufactured by RHEOMETRICS Company), and the result was expressed by an index using tan δ (50° C.) in Example 2 as the reference, which was set at 100. The smaller the value, the smaller the heat buildup and the better the low heat buildup property.

Preparation Example 1

Preparation of Catalyst A

Into a 100 ml glass vessel having a rubber stopper which had been dried and purged with nitrogen, 7.11 g of a cyclohexane solution (15.2% by mass) of butadiene, 0.59 ml of a cyclohexane solution (0.56 moles/liter) of neodymium neodecanoate, 10.32 ml of a toluene solution (3.23 moles based on the concentration of aluminum) of methylaluminoxane MAO (manufactured by TOSO AKZO Co. Ltd., PMAO) and 7.77 ml of a hexane solution (0.90 moles/liter) of diisobutylaluminum hydride (manufactured by KANTO KAGAKU Co. Ltd.) were placed in this order, and the resultant mixture was aged at the room temperature for 4 minutes. To the aged mixture, 2.36 ml of a hexane solution (0.95 moles/liter) of diethylaluminum chloride (manufactured by KANTO KAGAKU Co. Ltd.) was added, and the obtained mixture was aged at the room temperature for 15 minutes while the mixture was occasionally stirred. The concentration of neodymium in the solution of Catalyst A obtained as described above was 0.011 moles/liter.

<Polybutadiene Rubber A>

A glass bottle having a volume of about 1 liter and having a rubber stopper was dried and purged with nitrogen. A cyclohexane solution of butadiene which had been dried and purified and dry cyclohexane were placed into the glass bottle so that 400 g of a 5.0% by weight cyclohexane solution of butadiene was formed in the glass bottle.

To the resultant solution, 1.53 ml (corresponding to 0.017 moles of neodymium) of the solution of Catalyst A prepared in advance was added, and the polymerization was conducted in a water bath at 10° C. for 4.0 hour. Thereafter, 2 ml of a 5% by mass isopropanol solution of an antioxidant 2,2'-methylenebis(4-ethyl-6-t-butylphenol) (occasionally referred to as NS-5, hereinafter) was added at 50° C. to terminate the polymerization. The formed polymer was reprecipitated in isopropanol containing a small amount of NS-5 and dried by a drum drier, and Polybutadiene rubber A was obtained with a yield of about 100%. The result of analysis of Polybutadiene rubber A is shown in Table 1.

Preparation Example 2

Preparation of Catalyst B

Into a 100 ml glass vessel having a rubber stopper which had been dried and purged with nitrogen, 7.11 g of a cyclohexane solution (15.2% by mass) of butadiene, 0.59 ml of a cyclohexane solution (0.56 moles/liter) of neodymium neodecanoate, 10.32 ml of a toluene solution (3.23 moles based on the concentration of aluminum) of methylaluminoxane MAO (manufactured by TOSO AKZO Co. Ltd., PMAO) and 7.77 ml of a hexane solution (0.90 moles/liter) of diisobutylaluminum hydride (manufactured by KANTO KAGAKU Co. Ltd.) were placed in this order, and the resultant mixture was aged at the room temperature for 2 minutes. To the aged mixture, 1.57 ml of a hexane solution (0.95 moles/liter) of diethylaluminum chloride (manufactured by KANTO KAGAKU Co. Ltd.) was added, and the obtained mixture was aged at the room temperature for 15 minutes while the mixture was occasionally stirred. The concentration of neodymium in the solution of Catalyst B obtained as described above was 0.010 moles/liter.

<Polybutadiene Rubber A>

A glass bottle having a volume of about 1 liter and having a rubber stopper was dried and purged with nitrogen. A cyclohexane solution of butadiene which had been dried and purified and dry cyclohexane were placed into the glass bottle so that 400 g of a 12.5% by weight cyclohexane solution of butadiene was formed in the glass bottle.

To the resultant solution, 3.83 ml (corresponding to 0.043 moles of neodymium) of the solution of Catalyst B prepared in advance was added, and the polymerization was conducted in a water bath at 40° C. for 1.0 hour. Thereafter, 2 ml of a 5% by mass isopropanol solution of an antioxidant NS-5 was added at 50° C. to terminate the polymerization. The formed polymer was reprecipitated in isopropanol containing a small amount of NS-5 and dried by a drum drier, and Polybutadiene rubber A was obtained with a yield of about 100%. The result of analysis of Polybutadiene rubber B is shown in Table 1.

Examples 1 to 6 and Comparative Examples 1 to 6

Using Polybutadiene rubber A obtained in Preparation Example 1, Polybutadiene rubber B obtained in Preparation Example 2 and Softeners D to F shown in Table 2, rubber compositions were prepared in accordance with the formulations shown in Table 3 in steps such that the rubber component, carbon black, stearic acid, an antioxidant 6C and a softener were mixed in the non-product mixing of the first mixing step and, then, zinc oxide, an antioxidant 224, vulcanization accelerators and sulfur were mixed with the obtained rubber composition of the non-product mixing in the product mixing of the second step. The rubber compositions obtained as described above were treated for vulcanization under a condition of 160° C. and 15 minutes. As the physical property of vulcanized rubbers obtained from the rubber compositions of Examples 1 to 5 and Comparative Examples 1 to 5, the resistance to cut growth was measured, and the Mooney viscosity was measured as the physical property of the corresponding unvulcanized rubber compositions. The results are shown in Table 4. As the physical properties of vulcanized rubbers obtained from the rubber compositions of Examples 2 and 6 and Comparative Examples 2 and 6, the resistance to cut growth and the low heat buildup property were measured. The results are shown in Table 5.

TABLE 1

| Polybutadiene rubber | A | B | BR-01 |
|---|---|---|---|
| Content of cis-1,4-bond (%) | 99.02 | 94.5 | 96.06 |
| Content of vinyl bond (%) | 0.14 | 0.71 | 2.55 |
| Number-average molecular weight (Mn) | 225,000 | 219,000 | 162,000 |
| (Mw)/(Mn) | 2.2 | 1.9 | 3.6 |

BR-01: Manufactured by JSR Co., Ltd.

TABLE 2

| Softener | Aniline point (° C.) | Kinematic viscosity (mm$^2$/s) |
|---|---|---|
| D: mixed resin of C5-based petroleum resin and D9-based petroleum resin | — | — |
| E: process oil | 83 | 22.0 (40° C.) |
| F: process oil | 50 | 24.0 (100° C.) |

D: Aliphatic/aromatic mixed petroleum resin; manufactured by NIPPON ZEON Co., Ltd.; the trade name: "QUINTONE U190"
E: Naphthenic oil; manufactured by JAPAN ENERGY Co., Ltd.
F: Aromatic oil; manufactured by SHIN-NIPPON SEKIYU Co., Ltd.

TABLE 3

| Stage of mixing | Raw material | | Amount (part by mass) |
|---|---|---|---|
| Non-product mixing | polybutadiene rubber | | 60.0 |
| | natural rubber | *1 | 40.0 |
| | carbon black FEF | *2 | 50.0 |
| | stearic acid | | 2.0 |
| | antioxidant 6C | *3 | 3.5 |
| | softener | | refer to Tables 4 and 5 |
| Product mixing | zinc oxide | | 3.0 |
| | antioxidant 224 | *4 | 1.0 |
| | vulcanization accelerator CZ-G | *5 | 0.4 |
| | vulcanization accelerator DM-P | *6 | 0.2 |
| | sulfur | | 1.4 |

*1: RSS #3
*2: SIEST SO (the specific surface area by nitrogen adsorption: 42 m$^2$/g; manufactured by TOKAI CARBON Co. Ltd.)
*3: N-(1,3-dimethylbutyl)-N'-phenyl-p-phenylenediamine
*4: A polymerization product of 2,2,4-trimethyl-1,2-dihydro-quinoline
*5: N-cyclohexyl-2-benzothiazylsulfenamide
*6: Dibenzothiazyl disulfide

TABLE 4

|  | Poly-butadiene rubber | Softener | Amount of softener (part by mass) | Mooney viscosity ML1 + 4 (128° C.) | Resistance to cut growth (strain fixed at 100%) |
|---|---|---|---|---|---|
| Example 1 | A | none | — | 73 | 201 |
| Example 2 | A | D | 4 | 56 | 177 |
| Example 3 | A | E | 10 | 47 | 131 |
| Example 4 | B | D | 4 | 56 | 135 |
| Example 5 | A | E | 20 | 38 | 98 |
| Comparative Example 1 | BR-01 | none | — | 74 | 100 |
| Comparative Example 2 | BR-01 | D | 4 | 58 | 89 |
| Comparative Example 3 | BR-01 | E | 10 | 49 | 73 |
| Comparative Example 4 | BR-01 | E | 20 | 38 | 65 |
| Comparative Example 5 | A | F | 10 | 50 | 102 |

TABLE 5

|  | Poly-butadiene rubber | Softener | Amount of softener (part by mass) | Amount of carbon black (part by mass) | Resistance to cut growth (strain fixed at 100%) | Low heat buildup property (strain fixed at 3%) |
|---|---|---|---|---|---|---|
| Example 2 | A | D | 4 | 50 | 177 | 100 |
| Example 6 | A | D | 4 | 30 | 123 | 62 |
| Comparative Example 2 | BR-01 | D | 4 | 50 | 89 | 110 |
| Comparative Example 6 | BR-01 | D | 4 | 30 | 68 | 75 |

As shown in Tables 4 and 5, the rubber compositions of the present invention (Examples 1 to 6) were provided with excellent resistances to cut growth while sufficient workability was exhibited and could be advantageously used as the rubber composition for tire sidewall.

The 12 types of the rubber compositions in Examples 1 to 6 and Comparative Examples 1 to 6 were used for a sidewall of a radial tire for passenger cars having a size of 195/60R14 in a manner such that the sidewall was divided into 12 portions and one type of the rubber composition was used for each of the portions. A cut having a specific shape was formed on each portion of the sidewall. The tire was driven on a drum rotated at a high speed under the condition of a low internal pressure, and the growth of the cut was measured. The rubber compositions of Examples 1 to 4 and 6 provided remarkably improved resistance to cut growth in comparison with the rubber compositions of Comparative Examples 1 to 6. The rubber composition of Example 5 provided the same resistance to cut growth as that of the rubber composition of Comparative Example 1.

INDUSTRIAL APPLICABILITY

The rubber composition for tire sidewall of the present invention can be advantageously used for tire sidewall for passenger cars, light passenger cars, light trucks, trucks, busses and construction vehicles.

The invention claimed is:

1. A rubber composition for tire sidewall which comprises a rubber component and 10 to 70 parts by mass of carbon black having a specific surface area by nitrogen adsorption of 20 to 100 m$^2$/g per 100 parts by mass of the rubber component and does not comprise a softener having an aniline point of 50° C. or lower, the rubber component comprising polybutadiene rubber having a content of a cis-1,4-bond of 92% or greater and a content of a vinyl bond of 0.71% or smaller, and natural rubber and/or at least one other synthetic diene rubber, wherein the rubber composition comprises at least one softener selected from the group consisting of process oils which have a kinematic viscosity (40° C.) of 15 to 35 mm$^2$/s and an aniline point of 83 to 120° C., $C_5$ aliphatic petroleum resins and $C_9$ aromatic petroleum resins.

2. A rubber composition for tire sidewall according to claim 1, wherein the rubber component comprises 20 to 80 parts by mass of the polybutadiene rubber, and 80 to 20 parts by mass of natural rubber and/or at least one other synthetic diene rubber, per 100 parts by mass of the rubber component.

3. A rubber composition for tire sidewall according to claim 1, wherein the polybutadiene rubber simultaneously satisfies following relations (1) to (3):

(1) content of cis-1,4-bond $\geq$ 98.00(%);

(2) content of vinyl bond $\leq$ 0.75×(content of cis-1,4-bond)−73.25(%); and (3) content of vinyl bond $\leq$ 0.35(%).

4. A rubber composition for tire sidewall according to claim 1, which comprises 1 to 15 parts by mass of at least one softener per 100 parts by mass of the rubber component.

5. A rubber composition for tire sidewall according to claim 1, wherein the polybutadiene rubber is obtained by polymerization of 1,3-butadiene using a catalyst comprising a compound having a rare earth element of a lanthanoid series.

6. A rubber composition for tire sidewall according to claim 1, wherein the polybutadiene rubber has a number-average molecular weight (Mn) of 100,000 to 500,000.

7. A rubber composition for tire sidewall according to claim 1, wherein the polybutadiene rubber has a ratio of a weight-average molecular weight (Mw) to the number-average molecular weight (Mn), (Mw/Mn), of 1.6 to 2.7.

8. A tire which uses a rubber composition described in claim 1 for sidewall.

* * * * *